United States Patent
Migault et al.

(10) Patent No.: US 11,343,322 B2
(45) Date of Patent: May 24, 2022

(54) VIRTUAL EDGE NODE AS A SERVICE

(71) Applicants: Daniel Migault, Montreal (CA); Stere Preda, Longueuil (CA); Elaheh Jalalpour, Waterloo (CA); Enayatallah Ghaznavi, Waterloo (CA)

(72) Inventors: Daniel Migault, Montreal (CA); Stere Preda, Longueuil (CA); Elaheh Jalalpour, Waterloo (CA); Enayatallah Ghaznavi, Waterloo (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/955,419

(22) PCT Filed: Dec. 18, 2018

(86) PCT No.: PCT/IB2018/060283
§ 371 (c)(1),
(2) Date: Jun. 18, 2020

(87) PCT Pub. No.: WO2019/123273
PCT Pub. Date: Jun. 27, 2019

(65) Prior Publication Data
US 2021/0006625 A1    Jan. 7, 2021

Related U.S. Application Data

(60) Provisional application No. 62/607,057, filed on Dec. 18, 2017.

(51) Int. Cl.
*H04L 29/08*    (2006.01)
*H04L 67/14*    (2022.01)
(Continued)

(52) U.S. Cl.
CPC ............ *H04L 67/14* (2013.01); *H04L 63/166* (2013.01); *H04L 67/1097* (2013.01);
(Continued)

(58) Field of Classification Search
CPC ... H04L 67/14; H04L 63/166; H04L 67/1097; H04L 67/2842; H04L 69/16; H04W 76/12
See application file for complete search history.

(56) References Cited

U.S. PATENT DOCUMENTS 9,871,850 B1 * 1/2018 Brandwine ........... H04L 45/306
2003/0236745 A1 * 12/2003 Hartsell ............... G06Q 20/102
705/40
(Continued)

FOREIGN PATENT DOCUMENTS

EP    3152886 A1    4/2017
WO   2015140695 A1    9/2015

OTHER PUBLICATIONS

Sun, Gang, et al. "Optimal provisioning for elastic service oriented virtual network request in cloud computing." 2012 IEEE Global Communications Conference (Globecom). IEEE, 2012.*
(Continued)

*Primary Examiner* — Jimmy H Tran
(74) *Attorney, Agent, or Firm* — David J Rahmer; Ericsson Canada Inc.

(57) ABSTRACT

Systems and methods for virtualizing edge node functionality as a service for handling content delivery are described herein. An edge node receives a packet and determines if it associated with an established session and if it should be offloaded for processing. An offload status indicator and/or session context information can be added to the offloaded packet and it is transmitted to a subsequent edge node.

22 Claims, 12 Drawing Sheets

(51) Int. Cl.
*H04W 76/12* (2018.01)
*H04L 29/06* (2006.01)
*H04L 67/1097* (2022.01)
*H04L 67/568* (2022.01)
*H04L 69/16* (2022.01)

(52) U.S. Cl.
CPC .......... *H04L 67/2842* (2013.01); *H04L 69/16* (2013.01); *H04W 76/12* (2018.02)

(56) References Cited

U.S. PATENT DOCUMENTS

| | | | | |
|---|---|---|---|---|
| 2005/0005025 | A1* | 1/2005 | Harville | H04L 65/4084 709/241 |
| 2007/0038994 | A1* | 2/2007 | Davis | H04L 67/10 717/174 |
| 2007/0153782 | A1* | 7/2007 | Fletcher | H04L 61/2567 370/389 |
| 2008/0037425 | A1* | 2/2008 | Pan | H04L 29/06027 370/235 |
| 2010/0309784 | A1* | 12/2010 | Mihaly | H04L 29/12066 370/230 |
| 2011/0280216 | A1* | 11/2011 | Li | H04L 67/143 370/331 |
| 2012/0275597 | A1* | 11/2012 | Knox | H04N 21/8586 380/210 |
| 2014/0022985 | A1* | 1/2014 | Kalmbach | H04W 88/08 370/328 |
| 2014/0045486 | A1* | 2/2014 | Berg | H04W 40/36 455/422.1 |
| 2014/0241158 | A1* | 8/2014 | Anthony, Jr | H04L 45/306 370/235 |
| 2014/0297822 | A1 | 10/2014 | Agrawal | |
| 2015/0055623 | A1* | 2/2015 | Li | H04W 40/04 370/331 |
| 2015/0074187 | A1* | 3/2015 | Fletcher | H04L 61/1511 709/203 |
| 2015/0081847 | A1* | 3/2015 | Hao | H04L 65/4076 709/219 |
| 2015/0113157 | A1* | 4/2015 | Chan | G06Q 10/06 709/231 |
| 2015/0263916 | A1* | 9/2015 | Phillips | H04L 65/80 709/224 |
| 2015/0304209 | A1* | 10/2015 | Choudhury | H04L 45/26 370/255 |
| 2015/0341285 | A1 | 11/2015 | Aysola et al. | |
| 2016/0006836 | A1* | 1/2016 | LeFaucheur | H04L 65/80 709/203 |
| 2016/0173636 | A1* | 6/2016 | Wang | H04L 67/2842 709/213 |
| 2016/0191296 | A1* | 6/2016 | Scharber | H04L 41/5054 709/223 |
| 2016/0191600 | A1* | 6/2016 | Scharber | H04L 41/145 709/223 |
| 2016/0294701 | A1* | 10/2016 | Batrouni | H04L 43/0876 |
| 2017/0244680 | A1* | 8/2017 | Chen | H04L 9/0891 |
| 2017/0244682 | A1* | 8/2017 | Chen | H04L 67/26 |
| 2018/0069797 | A1* | 3/2018 | Williams | H04L 47/125 |
| 2019/0373521 | A1* | 12/2019 | Crawford | H04L 67/10 |
| 2020/0068048 | A1* | 2/2020 | Hermesh | H04L 29/06095 |
| 2020/0153882 | A1* | 5/2020 | Gero | H04L 67/1074 |
| 2020/0196210 | A1* | 6/2020 | Kanitkar | H04W 36/12 |
| 2021/0258246 | A1* | 8/2021 | Zhang | H04W 72/042 |
| 2021/0288942 | A1* | 9/2021 | Preda | H04L 65/4084 |
| 2021/0352123 | A1* | 11/2021 | Panagos | H04L 65/607 |
| 2021/0377359 | A1* | 12/2021 | Moustafa | G06F 16/9574 |

OTHER PUBLICATIONS

Nguyen, Kim-Khoa, and Mohamed Cheriet. "Virtual edge-based smart community network management." IEEE Internet Computing 20.6 (2016): 32-41.*

Wang, Nan, et al. "ENORM: A framework for edge node resource management." IEEE transactions on services computing (2017).*

Daniel Migault et al., A framework for enabling security services collaboration across multiple domains, 2017 IEEE 37th International Conference on Distributed Computing Systems, 12 pages.

ETSI, Network Functions Virtualisation (NFV) Release 3; Security; Security Management and Monitoring specification, GS NFV-SEC 013 V3.1.1, Feb. 2017, 54 pages.

ISR and Written opinion from corresponding application PCT/IB2018/060283.

* cited by examiner

VIRTUAL EDGE NODE AS A SERVICE

CROSS REFERENCE TO RELATED APPLICATIONS

This application claims the benefit of U.S. Provisional Application No. 62/607,057 filed on Dec. 18, 2017, the entire contents of which are hereby incorporated by reference.

TECHNICAL FIELD

The present disclosure generally relates to communication networks and security.

INTRODUCTION

Internet Service Providers (ISPs) provide the "last mile" connectivity to the end users, with a network they entirely control. As such, ISP represents a key player in a Content Delivery Network (CDN). A current dilemma is how to leverage their network for a large e.g. global CDN Provider, while not giving up control of their network.

Collaboration between global CDN Providers and ISPs have been considered a good mechanism for ISPs to monetize their network while keeping the control and value of their main asset: the access network. Collaboration consists in placing content from a CDN Provider into the ISP network, for example, closer to the end users to reduce the time delivery and overall the CDN service. On the other hand, the ISP also benefit from these optimizations as it also decreases the load on its network.

Conventionally, collaboration between CDN Provider and ISP is deployed via two types of services:

CDN as a Service (CDNaaS) where the CDN completely delegates the delivery to the ISP. In this case the ISP can be seen as a delegated CDN while the global CDN Provider is seen as the delegating CDN. Service Level Agreement (SLA) are agreed between the two CDNs. The IETF working group CDNI defines such interfaces.

Edge Node as a Service (ENaaS) also referred to as Cache Node as a Service consists of the ISP provisioning an Edge Node in its network controlled by the CDN Provider. The Streaming Video Alliance is an example of such approach.

CDNaaS has not been widely deployed as global CDN Providers are not ready to delegate or give up the control of their service to a third party. In other words, the trust associated to the SLA does not compensate the benefit provided by the delegation. Instead, CDN Providers prefer to agree with the ISPs on hosting a dedicated Edge Server owned by the CDN Provider that is administrated by the CDN Provider. Such platform remains at the boundaries of the ISP network. This status quo situation leaves room for improvement both 1) in term of performances for the CDN Provider by placing these devices deeper into the ISP network, and 2) the ISP is unable to manage or control the Edge Server.

ENaaS has been considered as one mechanism to improve this status quo situation, and the ISP provides the Edge Server to the global CDN Provider. This enables the ISP to better manage and operate the Edge Server within its Cloud infrastructure. However, the conventional design of the Edge Node prevents an ISP to move such an Edge Node deeper in its network and take advantage of fog computing, i.e. to use the resource as close as possible to the end user to reduce the latency of the delivery, improve the user experience, and reduce the load on its network, etc.

SUMMARY

It is an object of the present disclosure to obviate or mitigate at least one disadvantage of the prior art.

In aspects of the present disclosure, there are provided systems and methods for virtual edge nodes as a service for handling content delivery.

In a first aspect of the present disclosure, there is provided a method performed by an edge node. The edge node can comprise processing circuitry and be configured to receive a packet indicating a session. It can be determined that the indicated session is an established session. It can be determined whether the packet should be processed by the edge node or offloaded by the edge node. Responsive to determining to offload the packet, the edge node modifies the packet to include at least one of an offload status indicator and context information associated with the session; and transmits the modified packet to a subsequent edge node.

In some embodiments, the session can be at least one of a Transport Layer Security (TLS) session and a Transmission Control Protocol (TCP) session. In some embodiments, the edge node can decrypt the session.

In some embodiments, determining that the indicated session is an established session can include determining that the edge node has context information associated with the session.

In some embodiments, it can be determined to offload the packet in accordance with at least of one an end user and a content request associated with the packet. In some embodiments, the determination can be in accordance with a resource bandwidth associated with the edge node.

In some embodiments, modifying the packet can include encapsulating the received packet and adding the at least one of the offload status indicator and the context information as metadata.

In some embodiments, the edge node can receive a second packet indicating the established session and determine to process the second packet. In some embodiments, it can be determined if the second packet requires enforcement of a security policy. Determining that the second packet requires enforcement of the security policy can be in accordance with at least of one an end user and a content request associated with the second packet. In some embodiments, the edge node can instantiate at least one service function for enforcing the security policy.

The various aspects and embodiments described herein can be combined alternatively, optionally and/or in addition to one another.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures, wherein.

DETAILED DESCRIPTION

Figure 1:
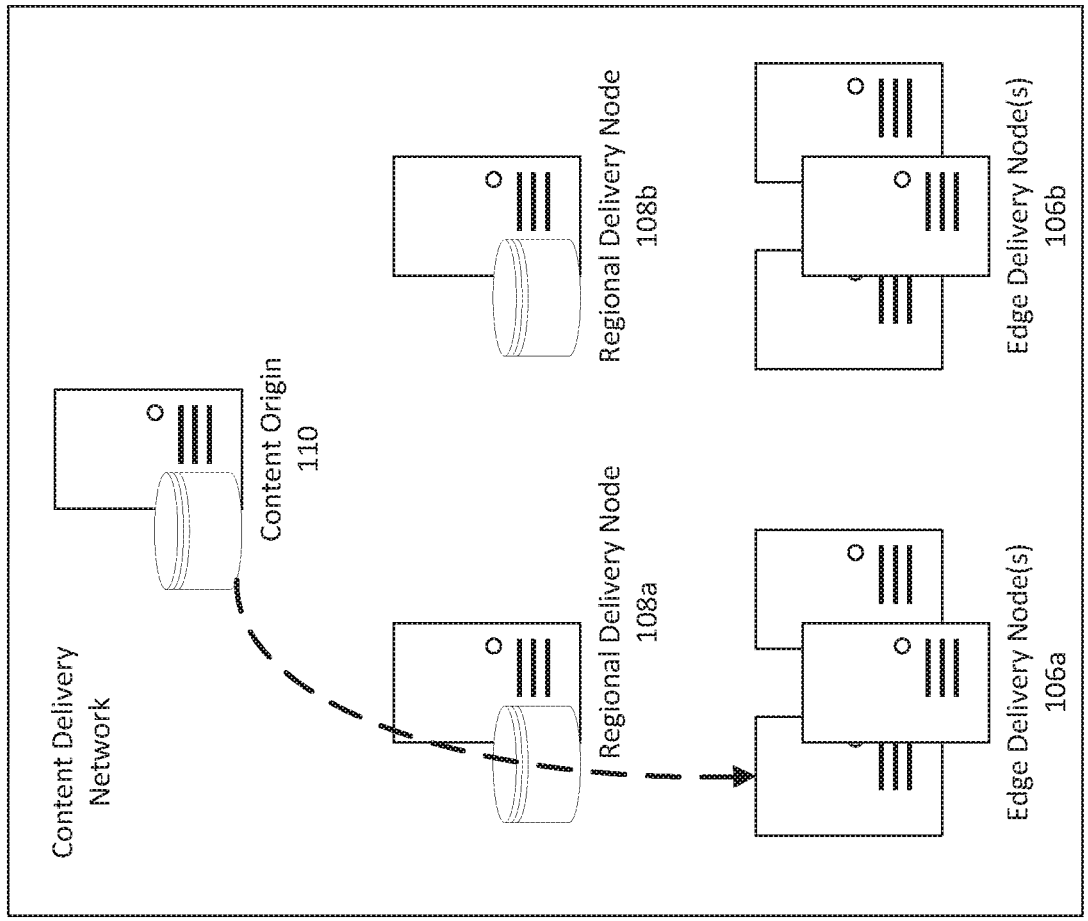
FIG. 1 illustrates an example CDN architecture.
Figure 1:
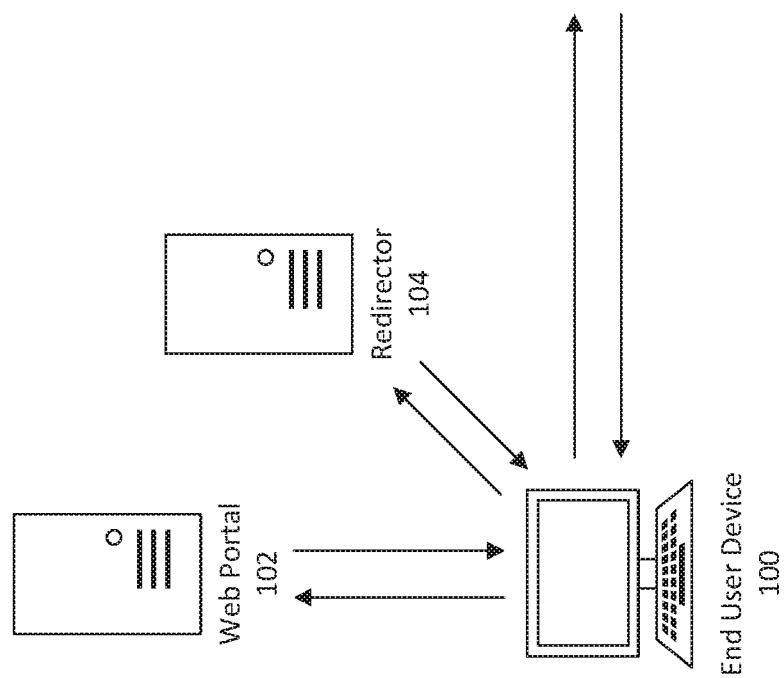

The embodiments set forth below represent information to enable those skilled in the art to practice the embodiments. Upon reading the following description in light of the accompanying drawing figures, those skilled in the art will understand the concepts of the description and will recognize applications of these concepts not particularly addressed herein. It should be understood that these concepts and applications fall within the scope of the description.

In the following description, numerous specific details are set forth. However, it is understood that embodiments may be practiced without these specific details. In other instances, well-known circuits, structures, and techniques have not been shown in detail in order not to obscure the understanding of the description. Those of ordinary skill in the art, with the included description, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

Some drawbacks of the conventional CDN approaches include Edge Nodes not being able to treat a subset of users. Edge Nodes terminate all sessions associated with a destination IP address, and as such need to be provisioned (configured) accordingly. Even though the deeper the Edge Node location is, the smaller the number of sessions are expected to be terminated, cloud-based elasticity mechanisms to scale in and out the resource when needed are likely to be required. Such design prevents Edge Nodes to take advantage of fog computing where computing and memory resource is limited.

Conventional Edge Nodes are not able to be dedicated to deliver a specific content. As Edge Nodes terminate and serve all sessions associated with a specific IP address, and this IP address is likely to deliver different content, all content needs to be served. Even though cache management mechanisms may be used, this requires that the Edge Node is designed to host a large fraction of the content hosted by the original IP address. More specifically, it is common to only cache the most popular content. However, when capacity becomes low, the amount of content may become very low and small-scale traffic variation of traffic may easily make such an Edge Server underperform. Again, such design does not match with fog computing's constraints.

Conventional Edge Nodes are administrated by the CDN Provider, which manages redirection associated with the Edge Node using various mechanisms such as DNS redirection or IP anycast combined with DNS redirection. In any case, instantiation of the Edge Node requires the CDN Provider to update the infrastructure presented to the end users. As such changes can impact the end users, this makes them very sensitive, and a CDN Provider is likely to reduce their occurrence especially when it has a limited control over the Edge Node infrastructure.

Some embodiments describe a Virtual Edge Node (VEN) approach. Virtualizing Edge Nodes (EN) can achieve advantages in terms of resource management in a Cloud computing environment, for example. However, virtualization is also a main driver for slicing the network, that includes instantiating the VEN deep into the Access Network in the ISP in order to improve the Quality of Service (QoS) as well as the Quality of Experience (QoE) with an ultra-low latency delivery. On the other hand, deep locations in the Access Network are also expected to have a lower amount of resources. Additional mechanisms can be provided to make possible the collaboration between VENs.

Some embodiments describe Virtual Edge Node as a Service (VENaaS) provided by an ISP for a CDN Provider. VENaaS is made possible because of their ability to collaborate to serve traffic. In addition, VENaaS is expected to be more efficient as VEN can be programmed to serve a specific content or a specific subflow. In addition, as VENs are expected to work over infrastructure with limited resources while being exposed to the Internet, VEN can be provided agile mechanisms that enable the VEN to instantiate Security Services adapted to a specific attack, where the security overhead can balance the overhead of the attack.

The conventional CDN infrastructure is mainly dedicated to Video on Demand (VOD), Streaming, and Web Acceleration. The first two services (VoD and Live Streaming) are typically only offered to users who have a subscription. Therefore, the user is known to the operator and requires successful authentication in order to receive the service (e.g. formal business relationship through contractual agreement). An attack perpetrated by this type of user can be easily traceable with high consequence to the subscriber due to their contractual agreement.

The Web acceleration service is typically a Web hosting service offered by the CDN operator. As for most websites, there is no authentication required. Also, in most cases the user accessing the website is not known to the operator (e.g. no formal business/subscriber relationship through contractual agreement).

Risk assessment of Web acceleration versus the first two services shows a higher risk of attacks and attack vectors. Moreover, the service is much more difficult to protect as the user pool is unknown (e.g. no authentication and unknown IP address range). For this reason, countermeasures deployed for VoD and Live Streaming may not be sufficiently robust for Web Acceleration services. In addition, it is expected that VoD or Streaming mechanisms may be wide open to Internet traffic in the future.

FIG. 1 illustrates an example CDN architecture. For VoD or Streaming, as shown in FIG. 1, the end user device 100 is connected to a web portal 102 which is responsible for authenticating the end user and presenting it the selection of VoD or streaming contents. When the end user selects content for download or for streaming, the web portal 102 provides an authorization ticket and directs the end user device 100 to a Redirector 104. The Redirector 104 is responsible for redirecting the authorized end users to the appropriate Edge Delivery Node 106. To check that the end user is authorized, it checks the authorization ticket and validates the information it contains with the end user request. To redirect the end user device 100 to the appropriate Edge Delivery Node 106, a Load Balancer can further consider, amongst other factors, the distribution of the content on the Edge Delivery Nodes 106, the availability of the Edge Delivery Nodes 106, and its localization. These pieces of information can be provided by a Management and Control Unit (not shown in FIG. 1) that can monitor, instantiate and provision the Edge Delivery Nodes 106. The Redirector 104 can also provide an authorization ticket to the end user device 100, so that it can be authenticated by the Edge Delivery Node 106. Finally, the end user is redirected to the appropriate Edge Delivery Node (e.g. 106a). The Edge Delivery Node 106 can check that the end user is authorized before starting the delivery.

For Web Acceleration, the end user device 100 sends a DNS and gets redirected to the most appropriate Web Site. In the case of VoD and Live Streaming, especially in the context of a wireless operator offering/operating the CDN service, the IP address range is known, which enables redirecting the end user to the appropriate Edge Delivery Node 106. The main characteristic is that, in Web Acceleration, the end user is not authenticated and can originate from any IP address.

In both cases, Edge Delivery Nodes 106 can implement caching mechanisms as shown in FIG. 1. When the requested data is not hosted on the particular Edge Delivery Node 106, it can request the content from an upper node in the CDN. This upper node can be a Regional Delivery Node 108 or the Content Origin 110.

Figure 2:
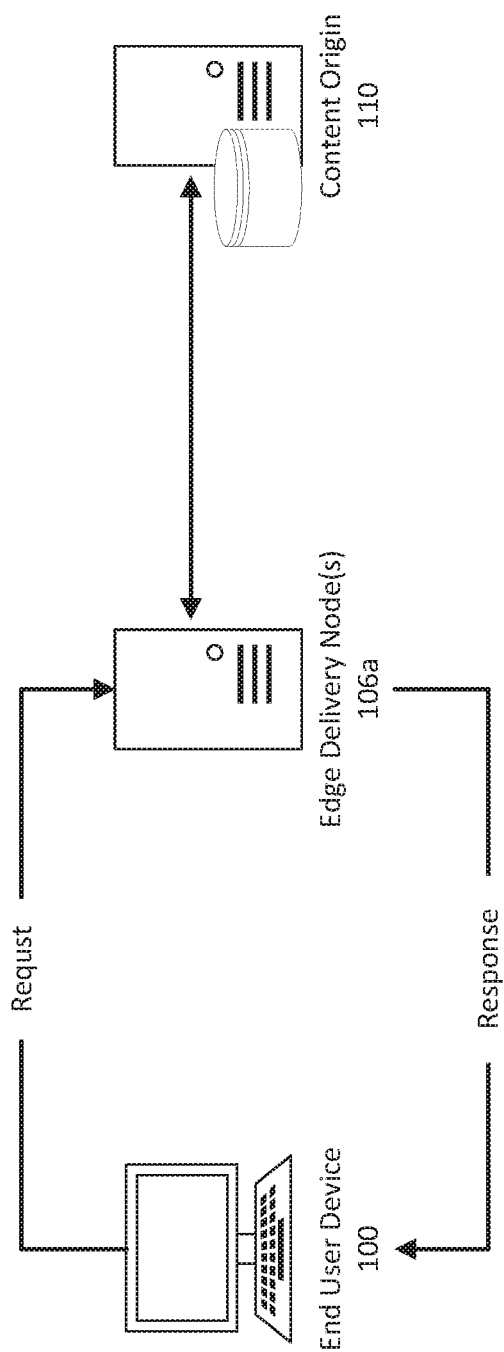
FIG. 2 illustrates an example Edge Node.

An example Edge Node 106a is illustrated in FIG. 2, which can be seen as nodes terminating the Transport Layer Security (TLS) and/or Transmission Control Protocol (TCP) session on behalf of the content owner. In other words, the Edge Node 106a terminates all TCP and TLS session and serves all content requested by the end user device 100. Edge Node 106a can be considered a caching proxy. When requested content is not yet cached, the Edge Node 106a requests the content from the Content Origin/Owner 110.

As a result, such an Edge Node 106a cannot be instantiated into a constrained environment such as cloud/fog computing since its resources cannot be dedicated to a subflow of the traffic, its resources cannot be dedicated to a specific content, and it cannot collaborate with other Edge Nodes 106.

Figure 3:
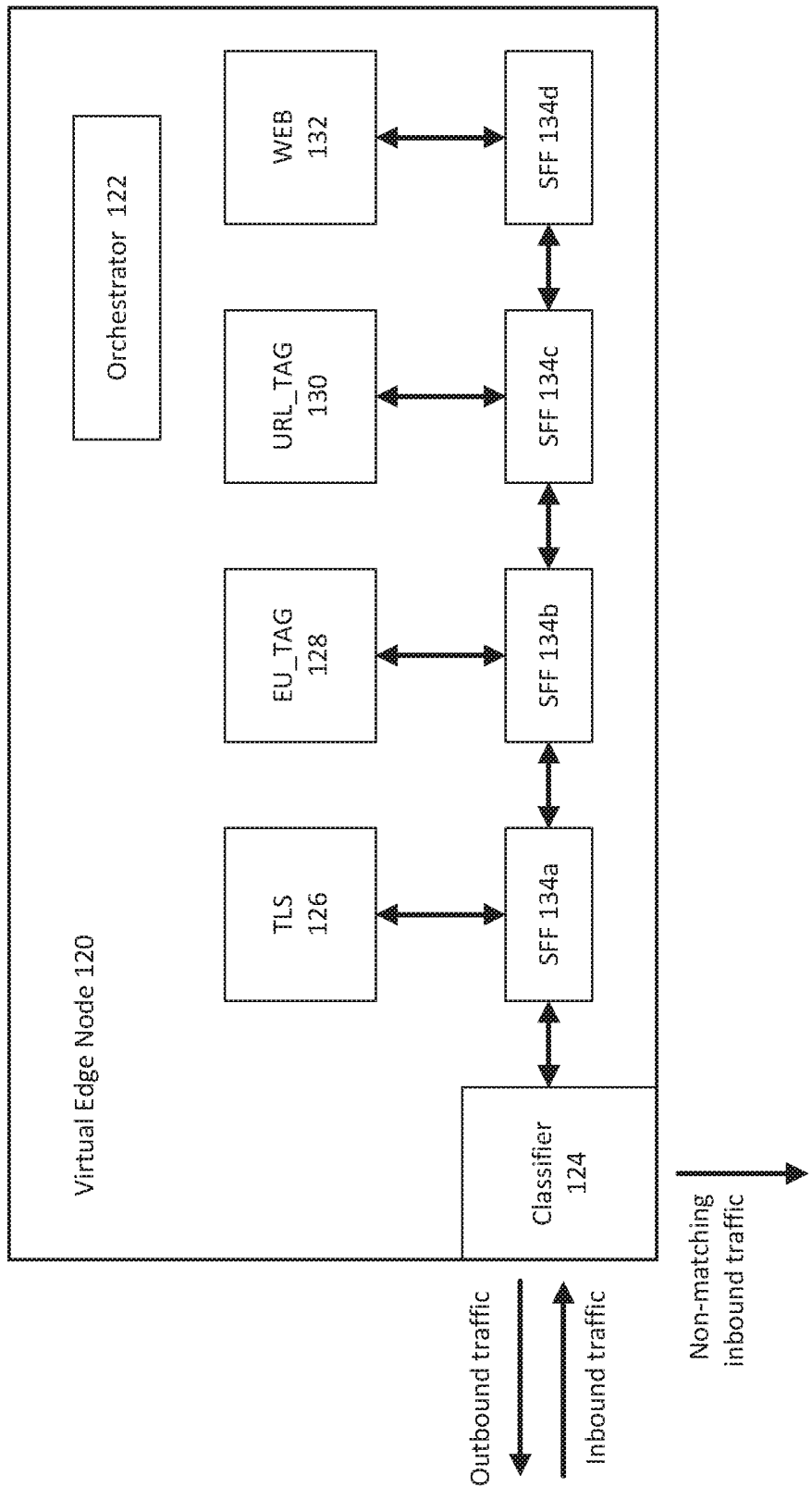
FIG. 3 illustrates an example Virtual Edge Node deployment.

FIG. 3 illustrates an example Virtual Edge Node (VEN) 120 deployment. As will be described, the VEN 120 can be seen as the orchestration of a set of Service Functions (SF) orchestrated by the VEN Orchestrator 122. The VEN 120 can follow the SFC (Service Function Chain) architecture and traffic between the SFs can use the Network Service Header (NSH) protocol, for example, which enables steering traffic between SFs as well as metadata.

With respect to FIG. 3, a VEN 120 can be composed of the following elements. A Classifier 124 (denoted as a Primary Service Function Forwarder (SFF)) can determine whether the traffic is served by the VEN 120. Traffic served by VEN 120 is the traffic matching rules (as will be described in FIG. 4). In this case, the Classifier 124 is typically configured to accept sessions that are already associated with that specific VEN 120 as well as new incoming sessions. The accepting of a new session can be defined by a policy and can depend on the resource capacity of the VEN 120.

TLS SF 126 indicates a TLS encapsulation/decapsulation function. For sessions that are already established, this SF is part of the regular processing of the sessions. However, when acceptance or rejection of a session is based on the URL, then TLS sessions are agreed and terminated by the VEN 120 previously to establish whether the session should be treated by the VEN 120.

EU_TAG 128 and URL_TAG 130 are SFs that define whether a session in the process of being established is in the scope of VEN 120 or not. EU_TAG 128 is the "End User TAG" SF. It is a SF that can be used to define whether a user is authorized or should be offloaded. URL_TAG 130 is the "Universal Resource Locator (URL) TAG" SF. It is a SF that can be used to define if a URL should be served by the WEB SF 132. WEB 132 is the Web Server SF for serving the URL for the end-user.

SFFs 134 are responsible for forwarding packets received from the network to one or more SFs associated with a given SFF. The SFs receive data packets from a SFF 134.

A VEN 120 can be configured to serve a subset of matching traffic and serving with zero configuration with the Classifier 124. Mechanisms implemented by the Classifier 124 can enable the VEN to serve traffic for a CDN Provider with no configuration, reduce the load of the VEN by preventing incoming new sessions, and reduce the load by limiting the traffic to a subflow based on traffic selectors (typically IP addresses).

From a CDN perspective, the potential traffic the VEN is dedicated to can be described by: (a) a set of IP address that designate the targeted server by the End User, and (b) a set of content files.

However, traffic selection is not limited to such criteria. End user device IP address(es) may also be considered as well as external parameters that are not derived from the traffic such as the resource available on the VEN. For that reason, a VEN should be able to accept only a limited fraction of the targeted traffic.

The subtraffic addressed by the VEN can be composed of "Established Sessions", e.g. session(s) for which a TCP/TLS session is already set. Such sessions should be considered by the VEN and should not be ignored. If the VEN is willing to ignore such sessions, it will need to perform a specific offload action based on collaborating capabilities. Such capability will be later described. Establishing Sessions, for example TCP session establishment sessions or TLS session establishment for Quick UDP Internet Connections (QUIC), for example, can be ignored by the VEN.

The VEN represents the IP destination of the Global CDN Provider but does not steer the traffic to that IP address using the IP routing protocol. Instead it uses NSH and SFF which makes steering independent from IP routing. As a result, an IP packet of an Established Session can be ignored by the VEN and left to other VEN(s) or even to the Global CDN Provider. This property also makes possible to serve an IP address without owning that IP address. More specifically, the ISP can serve on behalf of the Global CDN Provider while not owning the IP address on the Global Internet.

Figure 4:
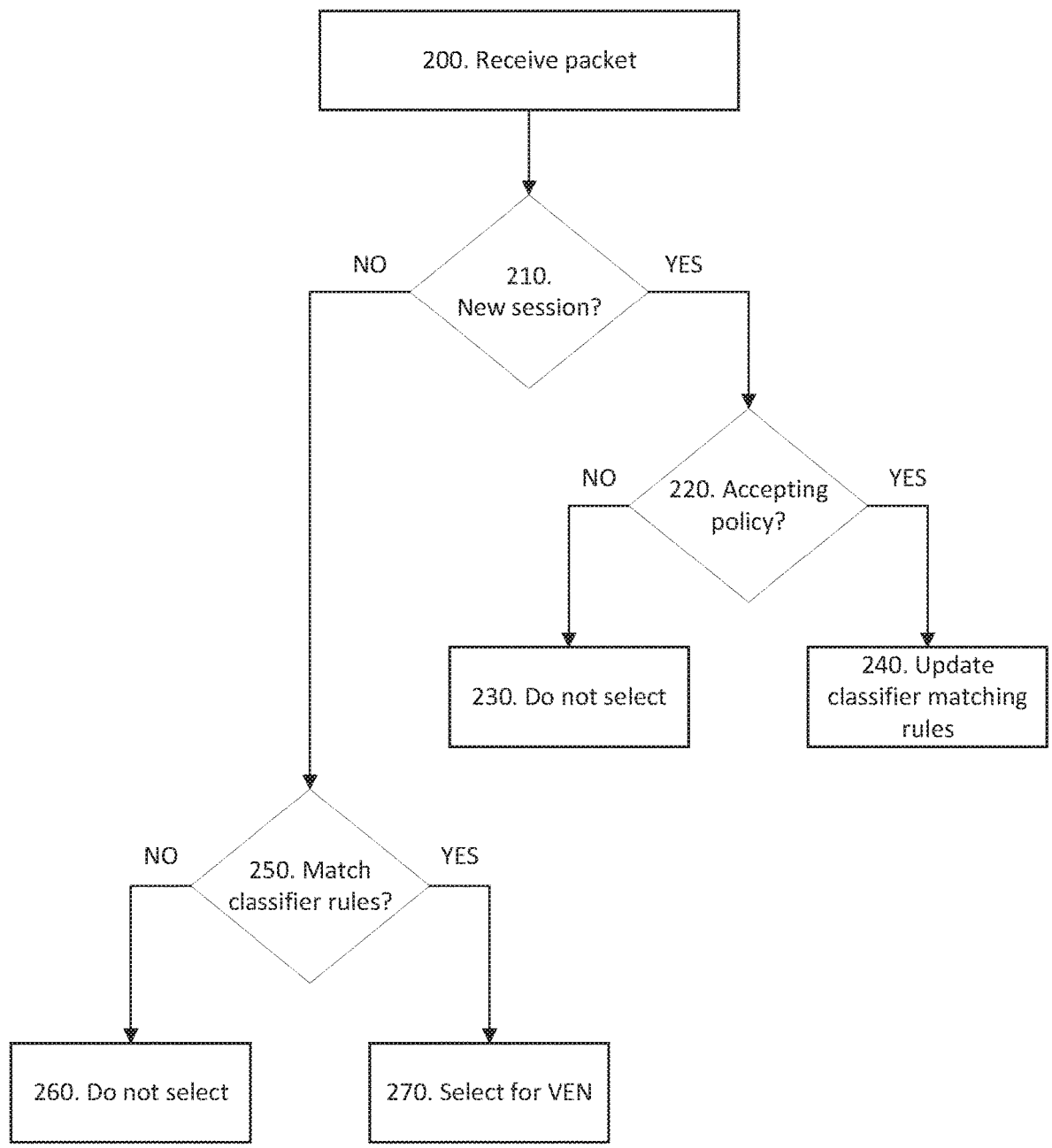
FIG. 4 is a flow chart illustrating an example method for processing an incoming packet.

FIG. 4 illustrates an example flow chart for processing an incoming packet. A VEN can be configured to serve a subset of matching traffic with a specific SF (e.g. EU_TAG and/or URL_TAG). The following will detail mechanisms that enables a SF to select whether the traffic is to be served by the VEN, or not, including a mechanism that enables the VEN to select a new session after multiple processing being performed to that packet (typically selection can be based on a URL encrypted with TLS), and a mechanism that enables the VEN to offload a session to an upstream VEN.

The VEN receives a packet (step 200) and determines if the packet is associated with a new session (e.g. a session that has not previously been handled by the VEN) (step 210). New sessions can be accepted by the VEN in accordance with an accepting policy (step 220) to determine whether the packet/session should not be selected by the VEN (step 230) or should be handled by the VEN (step 240). In the case where the packet/session is selected by the VEN, classifier matching rules can be updated to include the new session (step 240).

In the case where the received packet is associated with a known or established session, the VEN determines if the packet/session matches one or more classifier rules (step 250) to determine if the packet should be not selected for processing by the VEN (step 260) or selected for processing by the VEN (step 270).

In some embodiments, the selection of the traffic to be served is performed by the Classifier function. However, the Classifier may not, for efficiency reasons, be able to parse precisely the packet and define the acceptance based on the URL, for example. In addition, when the traffic is encrypted, such information may not be accessible.

When inspection of the TLS content is necessary, there may be no work-around other than first proceeding with a decryption before inspection by the Classifier. TLS decryption requires a TLS session being negotiated between the VEN and the end user device. TLS negotiation between the VEN and the end user on behalf of the CDN Provider may be performed using conventional mechanisms. The TLS credentials can be shared by the CDN Provider, or additional mechanisms may be used such as LURK, TLS delegated credentials or STAR for example.

As long as no session is terminated by the VEN, a packet may be returned by the Classifying SF such as IP_TAG or URL_TAG and re-sent outside the VEN with no visible impact, given that the additional latency is believed to be minimal. Typically, the packet will need to be returned outside the VEN so that it can be treated by another VEN. Furthermore, as packets are part of a session, the necessary information associated with the session (e.g. context information, synchronization information, etc.) may also needs to be exported. As a result, the treatment associated with such a packet depends at least on the location in the chain of the Classifying SF, the signaling of the packet associated with the session and the current state of the session. In the case of a packet initiating a NEW Session, the session has not been created yet and is not expected to have associated states, so returning the exact packet outside the VEN may be sufficient. When a session has been established, the case is treated by an offload operation. The difference is that in the case of the NEW Session, the packet can be sent to the IP traffic, while with a session offload, information related to the session need to be exchanged between the VENs.

The packet can be NSH decapsulated by the last SFF, which can be collocated with the Classifier. It is recommended to include a DECLASSIFYING NSH metadata to indicate that this packet MUST NOT be re-accepted by the Classifier. This could be useful for example when different interfaces for inbound and outbound traffic are used by the Classifier and the last SFF. Similarly, this indication may also be considered by other on-path SFs. The packet will be routed using the IP protocol to reach either another VEN or the Global CDN Provider. There is not necessarily a need for the Classifier to perform specific action, as the NEW session packet is expected to be unique, and unless it is being replayed it has little chances of being accepted again by the classifier.

The constraint is that the selection can only be processed to a packet setting a NEW session.

In the case of 0-RTT protocols such as QUIC, an HTTP GET equivalent may be provided by the packet setting a NEW session. In other words, the same packet is used to set the TLS and HTTP session.

When the URL_TAG (or IP_TAG) SF rejects the new session request, the packet is steered with a DECLASSIFYING metadata. The URL_TAG SF can steer the packet through the regular SFC in which case the packet will go through the WEB SF, or bypass the SFC in which case the packet will be steered directly to the Classifier by the TAG SF.

Upon receiving a DECLASSIFYING by the SF, the packet should be ignored by the SF and steered though the path.

For protocols such as HTTPS, for example, the URL_TAG is unlikely to DECLASSIFY a session as TCP and TLS session are already established when the URL is analyzed. In this case, refusing a session associated to a specific content requires the VEN to offload the session. An OFFLOAD-OUT operation may be performed at any time, not necessarily at the time when the session is initiated.

When the URL_TAG or IP_TAG SF rejects the new session request, the packet is steered with an OFFLOAD-OUT metadata. The URL_TAG SF may steer the packet through the regular SFC in which case the packet will go through the WEB SF, or bypass the SFC in which case the packet will be steered in the direction of the Classifier by the TAG SF. In this example, the URL_TAG will steer the message to the TLS SF.

Upon receiving an OFFLOAD-OUT the SF should respond accordingly. The packet may be ignored by the SF and steered though the path. Typically, the WEB SF will not generate a response. It is recommended that a SF indicates explicitly whether the processing has been performed or not with a metadata associated to the context.

A SF that is storing a context needs to insert that context into a specific metadata. Typically, if the WEB needs a context, the context will be provided so that another WEB SF can restore the context and provide the appropriate response. Similarly, TLS and TCP SF will insert the associated context. The context is expected to be inserted using NSH metadata. The context is then removed from the SF after some time, typically when the OFFLOAD is effective.

Optionally, a SF can process the packet differently, or provide an indication on how the packet should be treated by the receiving SF.

An OFFLOAD-OUT operation is intended to offload a session out of the VEN. However, it is expected that the offloaded session is able to be restored in the new VEN accepting to host the session. This operation can be indicated by the OFFLOAD-IN metadata.

Upon receiving a OFFLOAD-IN the SF should respond accordingly. The action(s) as well as the context can be indicated by metadata. A WEB SF is expected to restore the context and process the packet. A TLS SF is expected to restore the process and NOT process the packet.

It should be noted that NSH metadata, such as DECLASSIFYING or OFFLOAD, are used as a communication channel between the SFs. The metadata does not carry any state but a request for actions to be performed by the SF. Such communication avoids extra communications and coordination of the SF by the orchestrator, with reduced signaling with the orchestrator.

In the case of a DECLASSIFYING, the packet is simply returned to the regular IP traffic. In the case of the OFFLOAD, the packet is returned to a specific VEN. The offloaded packet is not steered to the new VEN using IP routing as the metadata needs to be steered as well.

This mechanism enables a VEN to serve TLS traffic for a specific content. This is useful in the case of flash crowd mitigation, where the content can be hosted on a VEN with limited capacity very close to the end users.

VENs can be organized into an overlay network so a VEN can OFFLOAD a session to an upstream VEN. Once offloaded, the initial VEN can have no state(s) associated with that session which makes it different from any proxy alternatives which are stateful. Implementing a HTTP/TLS/TCP Proxy in the VEN may provide little advantage to the VEN over an EN. It would mean that once a TLS session is accepted, it has to be served. An advantage provided by the VEN is the ability to select, or not select, an incoming session, with the hope that the content matches the served content.

Instead, when the packet and TLS/TCP session is known to be out of scope of the VEN, the current VEN is willing to delegate the TLS/TCP sessions to an upstream VEN.

Figure 5:
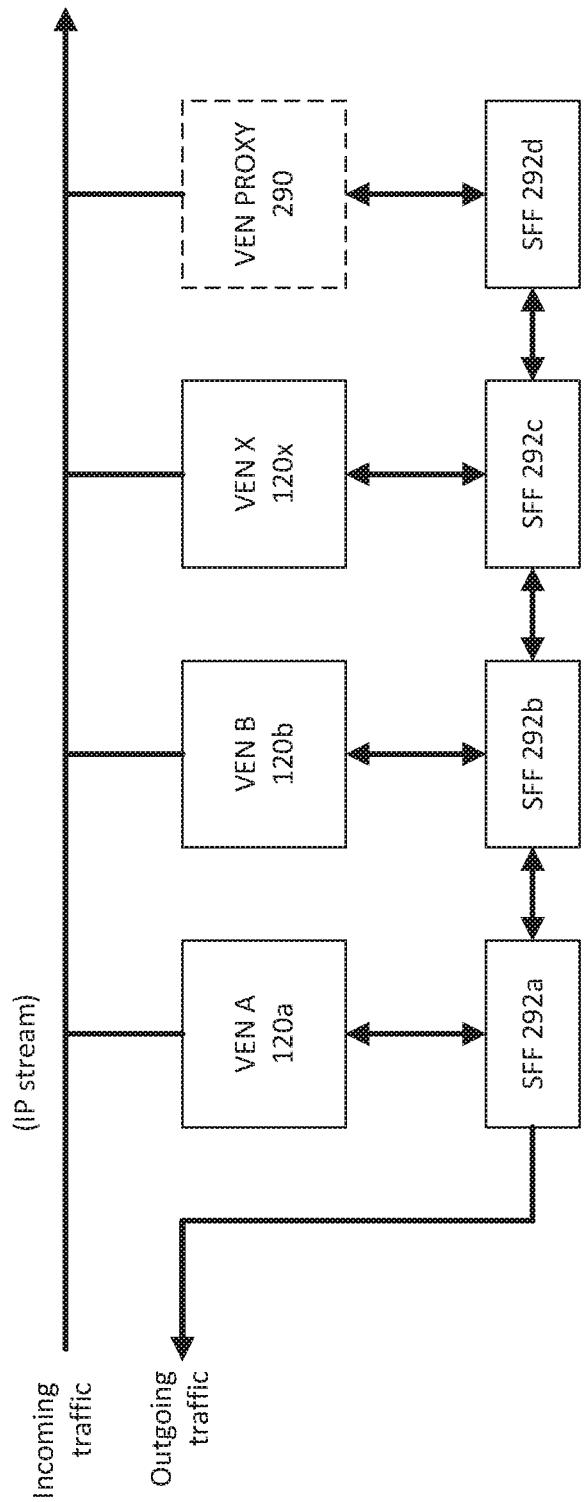
FIG. 5 is an example Virtual Edge Node Service Function Chain.

Multiple VENs 120a-120x can be organized into a Service Function Chain and the SFC is terminated by the VEN Proxy 290 as shown in FIG. 5. SFFs 292 can be used to steer traffic along the SFC.

The following example embodiment will describe the flows when a new session or an existing session is offloaded from a first VEN (VEN A 120a) to an upstream VEN (VEN B 120b). This example will consider a TCP/TLS Session. The OFFLOAD-OUT operation is performed once the session is established.

Step 1: VEN A 120a Classifier intercepts the session. The session can be an existing session, or a NEW session. When a NEW session is intercepted, VEN A 120a can terminate the session. VEN A 120a terminates the TCP session and becomes a TCP Termination Point. VEN A 120a proceeds to the TLS exchange and becomes a TLS Termination Point.

Step 2: VEN A 120a determines to offload the session. The determination to offload may be based on various factors such as, for example, the focus on serving a specific content, prioritization of new incoming sessions. VEN A 120a can perform the offload operation upon receiving a packet from the end user associated with the session, or not, in which case the packet is considered as void. In other words, triggering an offload is not necessarily done based on the packet sent by the end user. A session that is silent may also be offloaded.

Step 3: VEN A 120a outputs the message with an OFFLOAD-OUT metadata as well as all context and necessary information to enable the offloaded VEN to treat the session. Note that while OFFLOAD-OUT was used internally in the VEN to indicate the willingness of the VEN to offload the session, in this case the OFFLOAD-OUT metadata is expected to be interpreted as a request for an OFFLOAD-IN holder. As these actions are different, different metadata values may be used to characterize the communication within a VEN to communications between VEN.

Step 4: The packet is steered through the SFC. VEN B 120b can decide to handle the session. Upon receiving the packet: VEN B 120b sets the status of the packet to OFFLOAD-IN to indicate the SF to restore the session associate to the packet; VEN B 120b steers the packet through its various SFs; the SF behave accordingly to the session context and instructions provided in the metadata. In most cases they restore the context and forward the packet (e.g. without processing it).

When no candidate VEN selects the packet, the packet must be handled by the VEN PROXY 290. This element can be located in the cloud, so that resource availability may not be an issue. In addition, working as a TCP Proxy or TLS Proxy is expected to require less resources compared to caching (e.g. caching requires more complex storage and storage management mechanisms related to how popular a content is). The VEN PROXY 290 function may not be needed if the CDN Provider terminates the SFC.

As illustrated in FIG. 5, the VENaaS architecture enables a VEN to be instantiated on nodes with limited resources as the VENaaS provides the ability for a VEN to offload a session to another upstream/downstream VEN. In addition, it also enables a VEN to serve a specific content. At last, the VENaaS limits the impacts on redirections when a collaboration is established between an ISP and a CDN Provider. In fact, when the Terminating VEN is instantiated within the CDN Provider, the CDN Provider is free to change its collaboration without impacting the delivery service. This is due to different steering mechanisms used to reach the Terminating VEN (IP routing) as the steering to VEN is based on NSH encapsulation.

As shown in the CDN architecture, the VEN is the front-end element exposed to the Internet. While the current deployment of CDN takes advantage of cloud-based mechanisms to mitigate an attack, an ISP needs to be able to implement the VEN on nodes with limited resource which leads to the following paradigm: VEN are likely to be more vulnerable while unable to take advantage of most available protection mechanisms based on cloud elastic resource provisioning.

To address this paradigm, the VEN has been designed to be able to monitor, characterize and mitigate attacks dynamically. A default setting for monitoring any known attacks is by design inefficient as it will consume a lot of resource that could have been allocated to the content delivery service itself. In addition, such architecture is not scalable as attack are only expected to increase and as such, remaining resources dedicated for the service will reduce over time. Instead the VEN can handle security in a flexible way, that is upon detection of an anomaly impacting its operation, the VEN instantiates some specific monitoring service functions that in turn provide the indication to instantiate the necessary mitigation service functions. This is expected to deploy functionalities upon needs and thus resulting in lowering the security overhead while maximizing the resources available for the service itself.

Figure 6A:
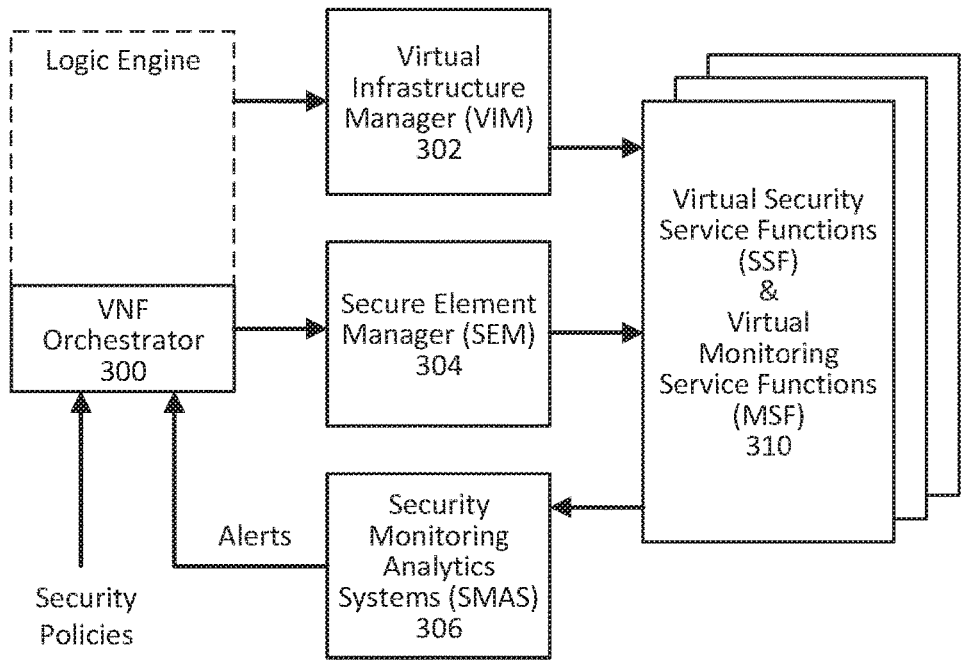
FIG. 6 is an example of VEN security.
Figure 6B:
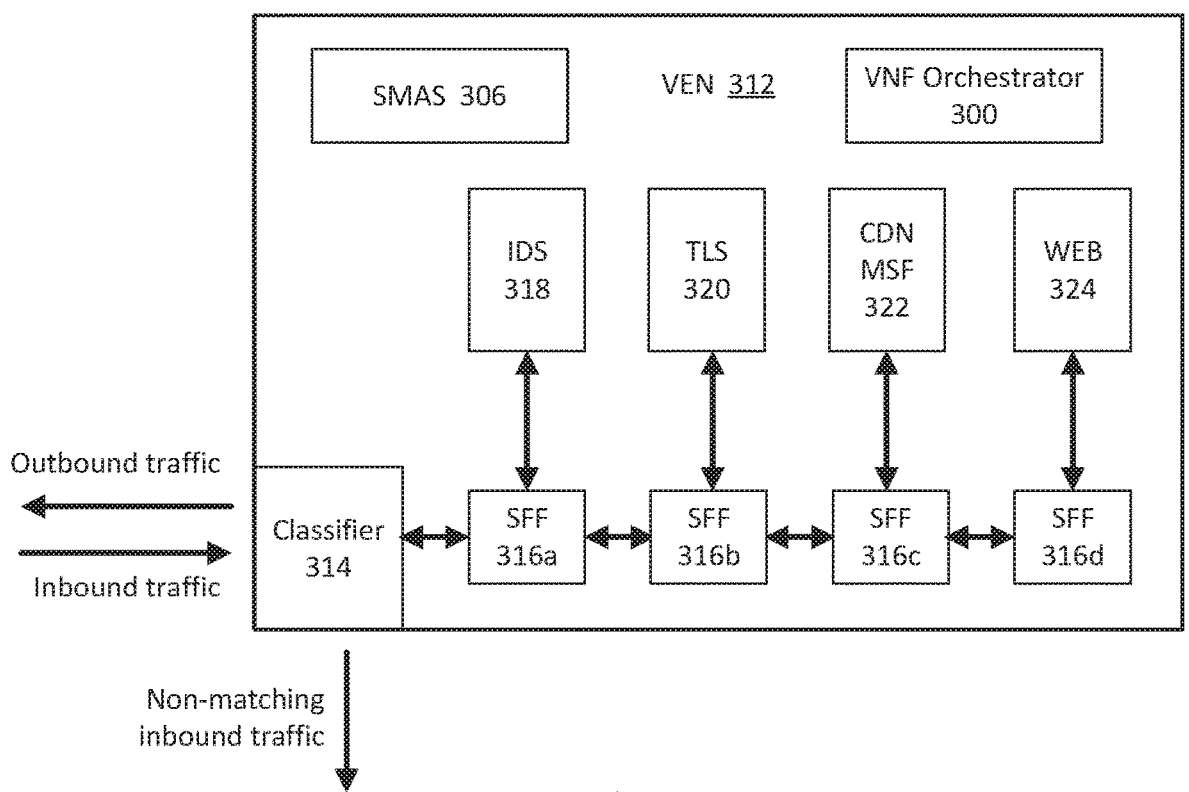

FIG. 6 illustrates an example of VEN Security. The orchestration of multiple security service function in a security context has been described in the ETSI GS NFVSEC specifications. Based on this specification, the VEN security architecture with the main elements is illustrated in FIG. 6a. An example of VEN security model instantiation is represented in FIG. 6b as a set of security service functions inside a virtual network that defines the boundaries of the VEN.

ETSI NFV-SEC-Based VEN Security Architecture

The elements of the NFV architecture represented in FIG. 6a are as follows.

The VNF Orchestrator (VNFO) 300 is part of the Logic Engine which enforces Security Policies according to received alerts and other information from the network. The enforcement of the Security Policies results in instructing the Virtual Infrastructure Manager (VIM) 302 of the Virtual Security Service Functions (S SF) and Virtual Monitoring Service Functions (MSF) 310 as well as instructing the Secure Element Manager (SEM) 304 to configure these SSF and MSF 310.

The Virtual Infrastructure Manager (VIM) 302 oversees instantiating the SSF and MSF 310. This also includes the selection and placement of these SSF/MSF 310 for example when multiple hardware, instances version, as well as locations are available.

The Secure Element Manager (SEM) 304 is responsible for configuring each SSF or MSF 310.

The Security Monitoring Analytics Systems (SMAS) 306 is responsible for aggregating inputs from the VEN and formatting them for the VNFO 300.

An example VEN Security Model Instantiation for security services is illustrated in FIG. 6b. To provide flexibility, the VEN 312 can be organized as a set of service functions (SF) connected within a Virtual Network that represents the boundaries of the VEN. This does not impose a VEN to have all its SF instantiated within a given hosts, and eventually functions may even be hosted on different datacenters with hypervisors interconnected via tunnels. The architecture is based on SFC and uses NSH to steer the traffic to the various SFs via SFFs 316. Note that in this example, all traffic is steered using NSH from the Classifier 314 to the WEB SF 324. The example VEN 312 illustrated in FIG. 6b comprises the following elements.

The Classifier 314 is responsible for selecting, from the traffic steered to the Terminating VEN, the traffic to be handled by the VEN 312.

SFFs 316 are responsible for steering the traffic between different SFs, the choreography is defined by the Orchestrator 300 and each path consists in the definition of a SFC.

IDS 318, TLS 320, CDN MSF 322 and WEB 324 are the involved security service functions. IDS 318 is the Intrusion Detection System SF used to inspect the traffic. TLS 320 is the Transport Layer security SF used to process the TLS decapsulation/encapsulation. CDN MSF 322 is the CDN Monitoring SF specifically related to CDN. WEB 324 is the web server SF that delivers the content.

VEN Orchestration Principles

Figure 7A:
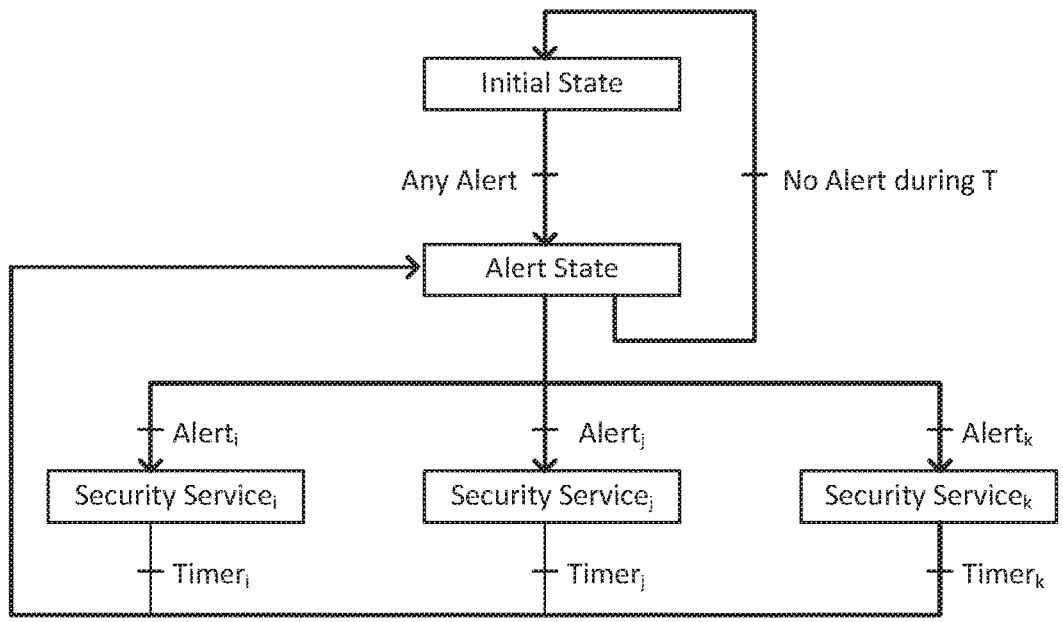
FIG. 7 is an example of VEN security states.
Figure 7B:
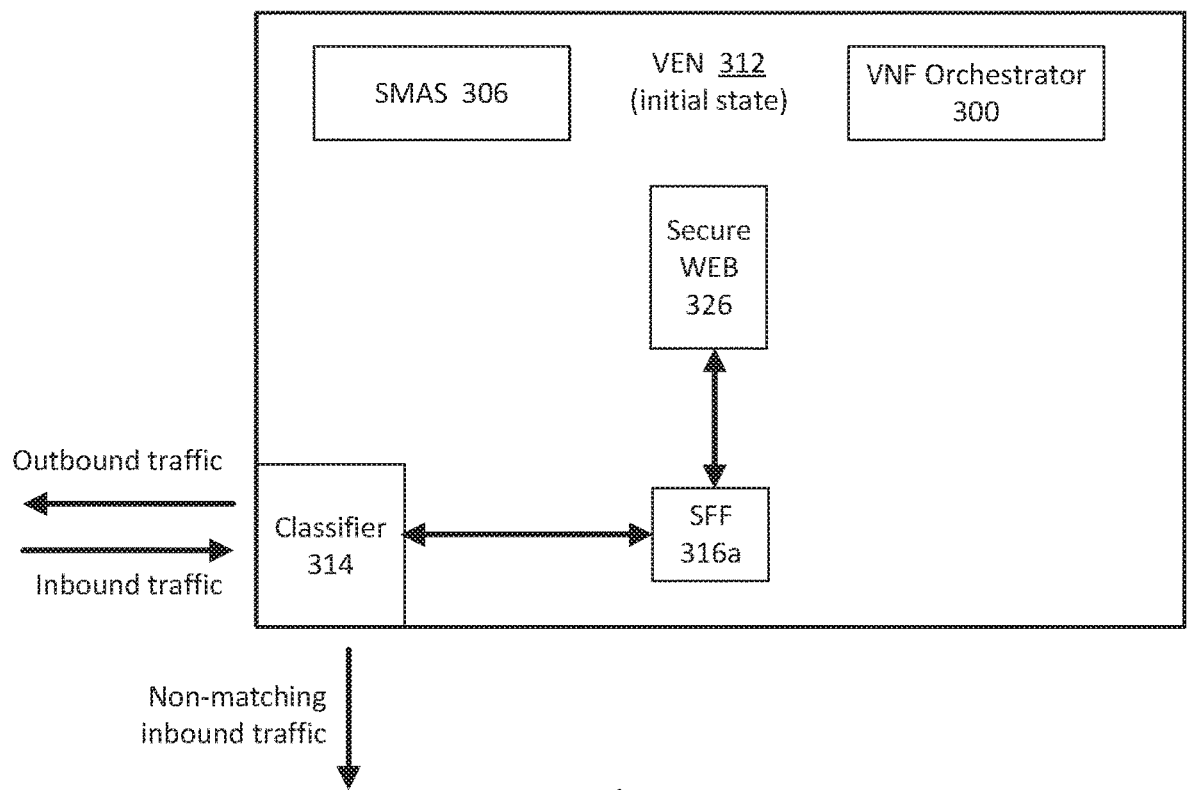

FIG. 7 illustrates an example of VEN security states. The structure of the orchestration and the various states is associated with the VEN 312 in FIG. 7a. First, VEN 312 is in an Initial State as depicted in FIG. 7b. The initial state consists of VEN 312 configured with a minimal number of SFs. Typically, in this case, a single SF (e.g. Secure WEB function 326) implements the TLS function and all the necessary SSF and MSF are reduced at minima. Typically, the SMAS 306 is expected to monitor the resource consumption of the VEN 312.

When the resource of the VEN reach a given level, the SMAS 306 raises an alert to the VNFO 300, which goes into an Alert State. The Alert State represents a configuration where the VEN 312 is monitoring the ongoing traffic to detect and qualify appropriately the attacks. The Alert state can be as was depicted in FIG. 6b. The VEN 312 is decomposed into various layers, for example, the TCP/TLS layers are handled by the TLS SF 320, the content delivery service is performed by the WEB SF 324 and a specific MSF 322 monitors the elements associated to that SF.

The VNFO 300 centralizes the Alerts received by the SMAS 306. The Security Policies are expected to compose the Alerts into identified attacks, which in turn results in the instantiation of a mitigation. The mitigation is designated as Security Service and corresponds to an organization of the VEN 312. Eventually, multiple Security Services may be instantiated simultaneously. In this case, each Security Service is instantiated during a certain time after which the VNFO 306 may decide to reconduct or cancel the Security Service.

Example Ven Threat Mitigation Scenarios

Three example scenarios of Security Service instantiation, the organization of various SSFs and MSFs for specific attack mitigation, will be described. The choreography between SSFs and MSF is orchestrated via SFC and using NSH. FIG. 8 illustrates the instantiation of these Security Service into a VEN. To facilitate understanding of the scenarios, configurations will be associated with individual attack mitigation. These configurations may be composed into more complex ones to mitigate simultaneous attack occurrences. The configurations depicted in FIG. 8 correspond to a transition from an Alert State (e.g. FIG. 6b). They are rolled back to the Initial State (e.g. FIG. 7b) after a timer expires or following an explicit indication that the attack ended.

VEN Availability

DDoS attacks on VENs are performed by overloading the VENs with illegitimate requests to exhaust their resources. As VENs are also expected to be instantiated on nodes with limited resources, Security Policies are likely to prevent this situation by: (1) forcing a VEN that is overloaded not to accept any new sessions; and (2) empowering the VEN to offload sessions to an upstream VEN.

Upon receiving an ALERT_RESOURCE_LOW alert from SMAS 306, the NFVO 300 instructs the SEM to limit new incoming sessions by the VEN 312. As incoming sessions are determined by the Classifier 314, the SEM typically will refuse any TCP SYN, and only accept already established TCP sessions. In addition, as depicted on the upper SFC of FIG. 8a, the NVFO 300 instruct the VIM to instantiate a CDN MSF SF 322a that monitors the traffic as well as a Web Application Firewall (WAF) SF 344. WAF 344 is a firewall at the application level that is able to filter requests and responses formatted according to, for example, the HTTP Live Streaming (HLS) protocol.

The NFVO 300 instructs the SEM to configure the MSF CDN 322 to report on abnormal behavior. The WAF 344 is instantiated by the VIM so the NFVO 300 can interact with the end user using HTTP Errors or for the NFVO 300 to instruct all on path SFs of a coordinated action, such as offloading a session.

Upon receiving a second ALERT\_RESOURCE\_LOW alert, the NFVO 300 can instruct the WAF 344 to offload a specific session, by returning the NSH packet with an OFFLOAD-OUT metadata. Upon receiving that metadata, the TLS SF 320 includes the TLS and TCP context, and the Classifier 314 (or a specific routing SFF 316) re-routes the packet to the SFC that connects the various VENs. Upon accepting to handle a new session, the Classifier 314 of VEN 312 steers the packet by replacing the OFFLOAD-OUT with OFFLOAD-IN, and in this example, the TLS SF 320 restores the TLS and TCP context.

Flash Crowd

A flash crowd occurs when a specific content is requested by a huge number of end users. Such scenario is not an attack per se, but it puts the infrastructure at risk, which makes it an important use-case for ISP and CDN Provider.

Figure 8A:
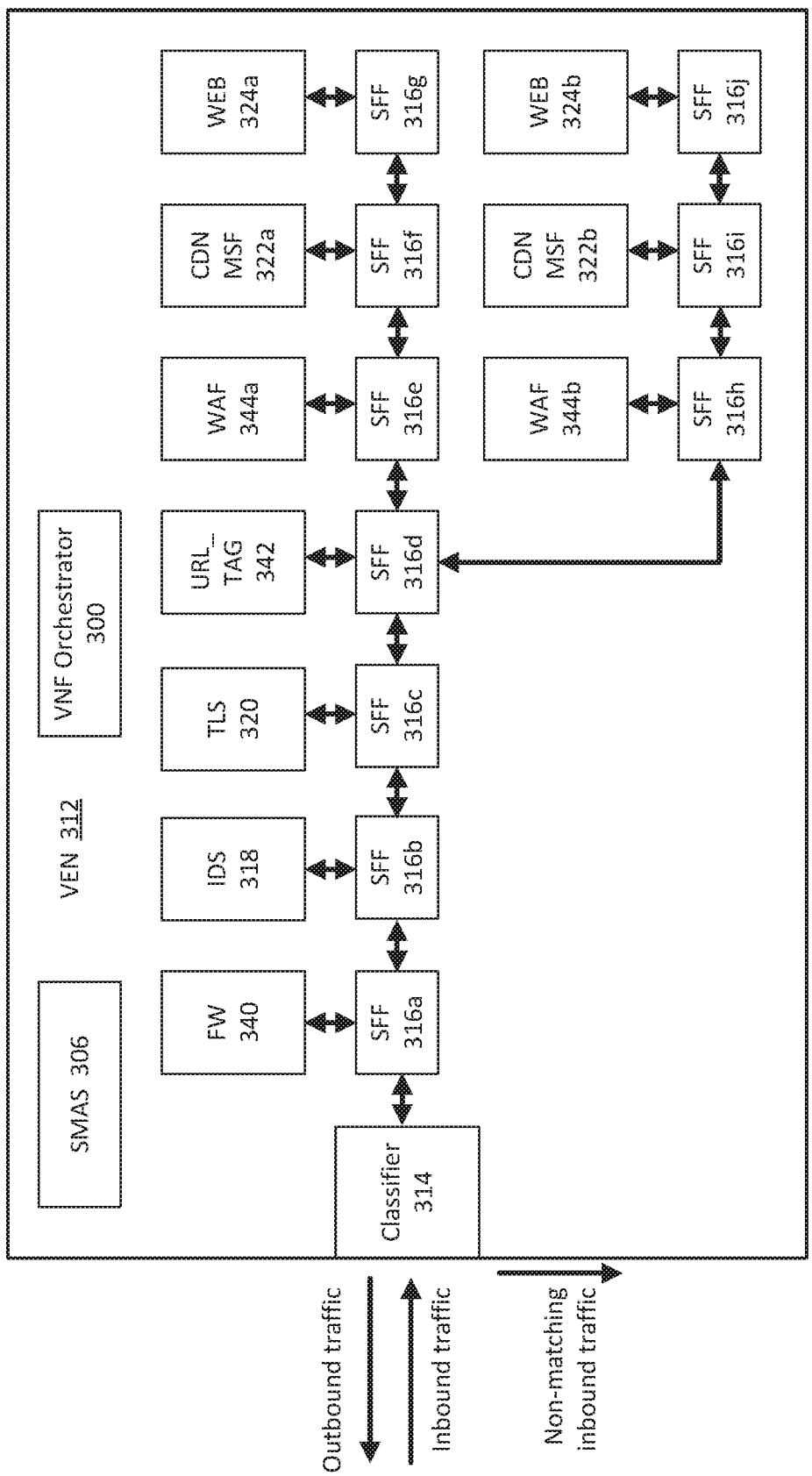
FIG. 8 is an example of VEN security services with SFC branching.

In order to enforce security policies dedicated to a flash crowd traffic, the VEN 312 can split the traffic into two different SFCs as depicted in FIG. 8a: one SFC dedicated to the non-flash crowd traffic and one associated to the flash crowd traffic. A firewall (FW) SF 340 can be used to filter all incoming traffic.

Upon the detection of a flash crowd, the SMAS 306 sends an alert to the NFVO 300, which creates a separate branch (e.g. a separate SFC within VEN 312) for the traffic associated with the flash crown content.

In order to split the different traffic into two SFCs, the VIM, instantiates the URL TAG SF 342 after the TLS SF 320, to tag packets as flash crowd traffic or regular traffic using NSH metadata. The VIM also configures the SFFs 316 to the appropriate SFC according to the tag. The VIM can also instantiate SFs such as the WAF 344b to apply specific security policies associated with the flash crowd situation. This can include the ability to offload a session or to enforce rate limiting policies.

It is assumed that the Security Policy gives the delivery of flash crowd content a higher priority compared to the other contents. Potential motivations may be that focusing the VEN on a single content requires little storage resource, thus maximizing the network over storage ratio. In addition, it also implements the principle of addressing the demand as close as possible to the source thus, protecting upstream resources with a shield of VENs.

Implementing such strategy requires the VEN to be able to offload a session that is not associated to a flash crowd content. First, an existing VEN may be serving ongoing sessions, but as sessions are assumed to be encrypted, to evaluate whether the content is associated to a flash crowd content or not, the VEN needs to terminate the TLS session before it can determine whether the session is associated to the flash crowd content.

In addition, when a VEN is serving only session associated to a flash crowd content, the VEN may also optimize the resource available to maximize the number of served end users with an acceptable quality of experience. This typically consists of delivering the video fragments that are being watched by the end user and avoiding download of fragments that will not be watched.

Let R the available resource of the VEN, r the necessary resource to deliver a video fragment, f the number of video fragments of the flash crowd video, and n the number of end users served by the VEN. In a worst-case scenario where end users download the f fragments while only watching the first one, such policies enable the VEN to serve f times more end users, R/r versus n=R/(f×r). Considering an average 138 second viral video length and technical recommendations to use a segment length between 2 and 6, such policies can increase by up to 60 the number of end users to be served by the VEN.

Such policies are implemented by the WAF SF 344b optimized for the streaming protocol with an anti-replay protection mechanism to limit the downloads for each user(s) during a given period of time. First, the download of manifest files which provides the necessary instructions to further download the fragments is limited. This is typically seen as preventing the end user to start downloading the fragments. Then, fragments download is also monitored to avoid unnecessary download, which includes replaying the download of a fragment as well as pro-active download of future fragments.

Different trigger levels can be set and the WAF dedicated to the flash crowd traffic can successively responds with a HTTP Error code 429 Too Many Requests to indicate the end user to reduce its request rate. Then, if the end user does not understand the error message, the WAF returns HTTP Error code 503 to indicate the service is not available. At last, HTTP requests may be discarded, before the WAF instructs the VEN to ban the end user to the VEN.

Malicious Users

The operation of banning an end user may have some strong economic impact in case of false positive detection. As a result, it is expected that malicious end users are handled incrementally, and that the decision to ban that user may be either automatically be performed or left to a network administrator.

An end user may be suspected as malicious upon for example the following behavior are observed:

A high number of sessions associated to a given IP address which may indicate a heavy provisioning download activity that can be postponed or reduced for a while.

A user requesting multiple non-cached content thus generating abnormal interaction with the Content origin.

A user generating too much traffic, for instance, by replaying the same video fragment.

Figure 8B:
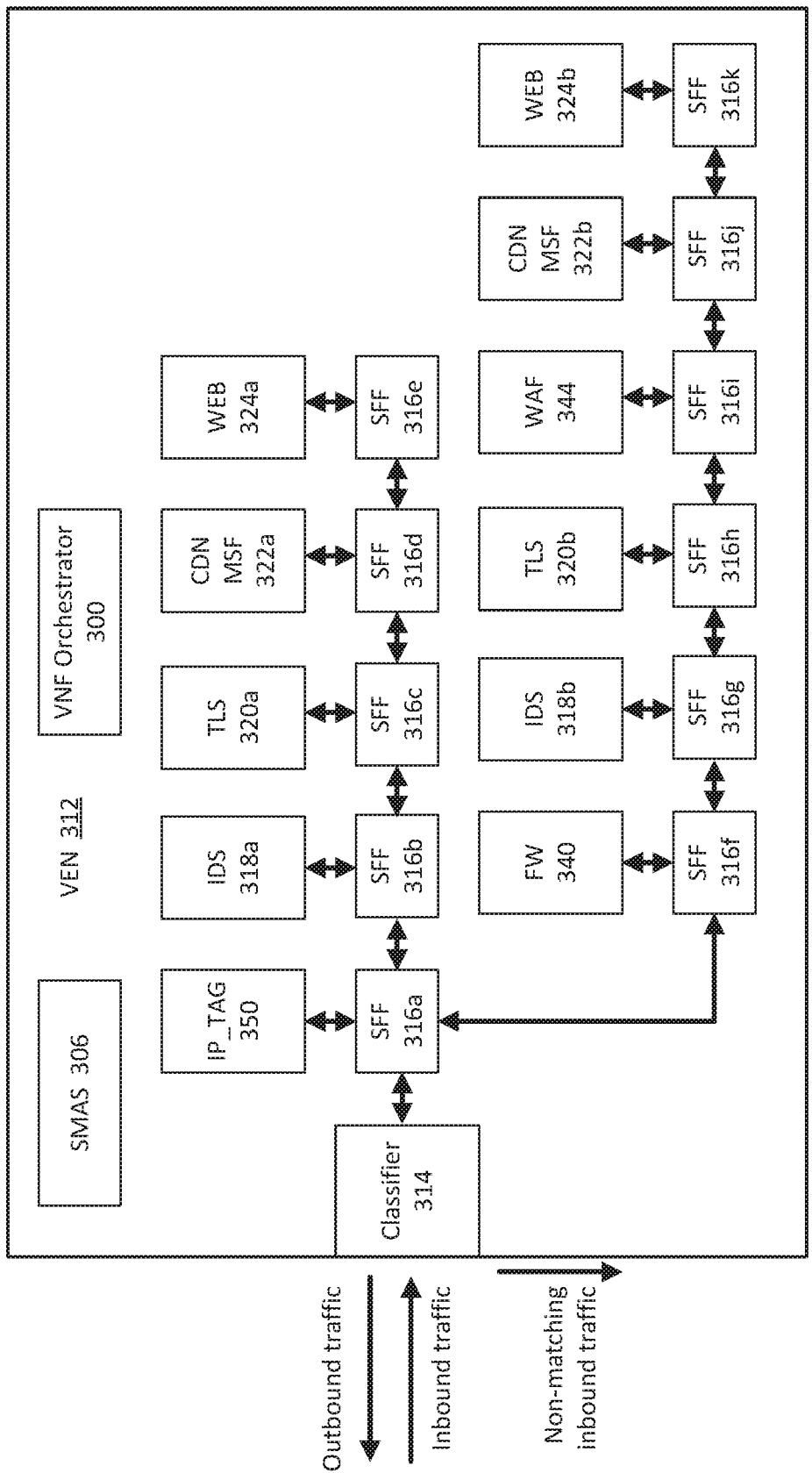

As shown in FIG. 8b, it is assumed that the security policy handles suspicious malicious end users by first isolating them through steering their requests to a specific SFC (the lower branch in FIG. 8b). The VIM instantiates an IP_TAG SF 350 with a similar role as the URL_TAG SF 342 in the previous embodiment. In addition, the VIM instantiates the following: (1) a CDN MSF 322b and a WAF 344 on the SFC dedicated to the malicious end users; and (2) a FW SF 340 that is expected to implement specific rate limiting policies or traffic filtering that cannot be blocked by the Classifier 314 or other SFs. Rate limiting traffic is typically an expensive operation as it requires to handle states for each end user. In FIG. 8b, grouping all malicious end users into one SFC enables the application of a global rate limiting policy which becomes almost stateless.

The NFVO 300 may instruct the SEM to configure the WAF 344 to limit the number of sessions associated with each user through enforcing an HTTP session rate limiting. When the SMAS 306 reports the NFV an end user is clearly identified as disruptive, the NFVO 300 may instruct the WAF 344 to send an NSH header with a BAN_END_USER. Upon receiving this NSH metadata, all SFs and MSFs on-path can remove the context associated to the banned user and the FW 340 can add a rule that blocks further incoming packets originating that user.

Figure 9:
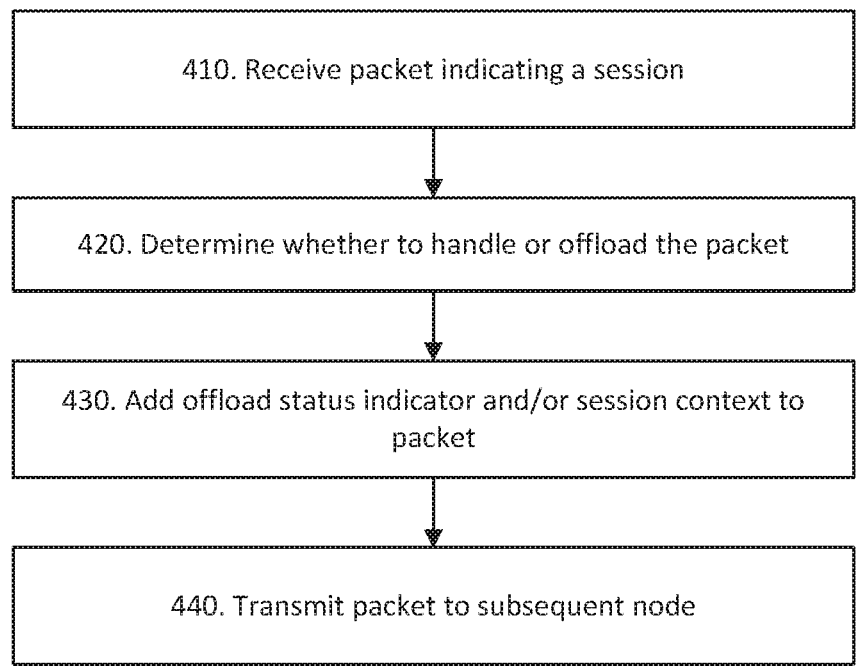
FIG. 9 is a flow chart illustrating an example method performed in a network node.

FIG. 9 is a flow chart illustrating a method which can be performed by a network node, such as an edge node or a virtual edge node in a content delivery network, as have been described herein. The method can include:

Step 410: Receiving a packet indicating a session at the network node.

Step 420: Determining whether to handle/process or to offload the packet by the node.

The step of determining if the packet should be processed by the node can include determining if the indicated session is a new session (e.g. a session that has not been previously handled by the node) or an established session (e.g. a session that has been previously handled by the node). It can be determined that the indicated session is an established session in accordance with determining that the node has context information associated with the session.

In some embodiments, responsive to determining that the indicated session is a new session, the node can select the packet for processing in accordance with an acceptance policy. In some embodiments, responsive to determining that the indicated session is a new session, the node can determine to offload the packet in accordance with the acceptance policy.

In some embodiments, responsive to determining that the indicated session is an established session, the node can select the packet for processing in accordance with a classifier rule. In some embodiments, responsive to determining that the indicated session is an established session, the node can determine to offload the packet in accordance with a classifier rule.

Step 430: Responsive to determining to offload the packet, adding an offload status indicator (e.g. as metadata) to the packet. Session context information can be further added to the packet. In some embodiments, the packet can be modified to include such information. In some embodiments, the packet can be encapsulated to include such information. In some embodiments, the additional indicator and/or context information can be appended to the packet as metadata. In some embodiments, the determination to offload the packet can be based at least in part on an end user associated with the packet, a content request associated with the packet, a resource bandwidth associated with the edge node, and/or an acceptance policy or classifier rule associated with the edge node as has been described herein. An end user associated with the packet can be identified by one or more addresses, such as an IP address. A content request associated with the packet can be identified by one or more parameters such as a URL associates with the content.

Step 440: Steering the packet through service function chaining to a subsequent (e.g. upstream or downstream in the SFC) edge node for handling.

It will be appreciated that one or more of the above steps can be performed simultaneously and/or in a different order. Also, steps illustrated in dashed lines are optional and can be omitted in some embodiments.

According to some of the embodiments described herein, VENaaS provides mechanisms for networks to handle content delivery. A VEN can be configured to determine whether to serve a subset of the traffic in accordance with a) the content, b) the end user's IP address or other element read from the (IP) packet, and/or c) other policy parameters such as the available resources of the VEN.

A VEN can be instantiated without requiring the CDN Provider to update the current configuration/setting of its architecture. A VEN can be instantiated deep into the access network without suffering from resource shortage.

A classifier function enables the VEN to serve traffic for a CDN Provider with minimal configuration, reduce the load of the VEN by preventing incoming new sessions in certain situation, and reduce the load by limiting the traffic to a subflow based on traffic selectors (e.g. IP addresses).

Some embodiments include mechanisms to enable a Service Function to select whether the traffic should be served by the VEN or not. Some embodiments enable a VEN to select a NEW session after multiple processing being performed on a packet. Typically, selection can be based on a URL encrypted with TLS. Some embodiments enable a VEN to offload a session to a subsequent upstream/downstream VEN.

Figure 10:
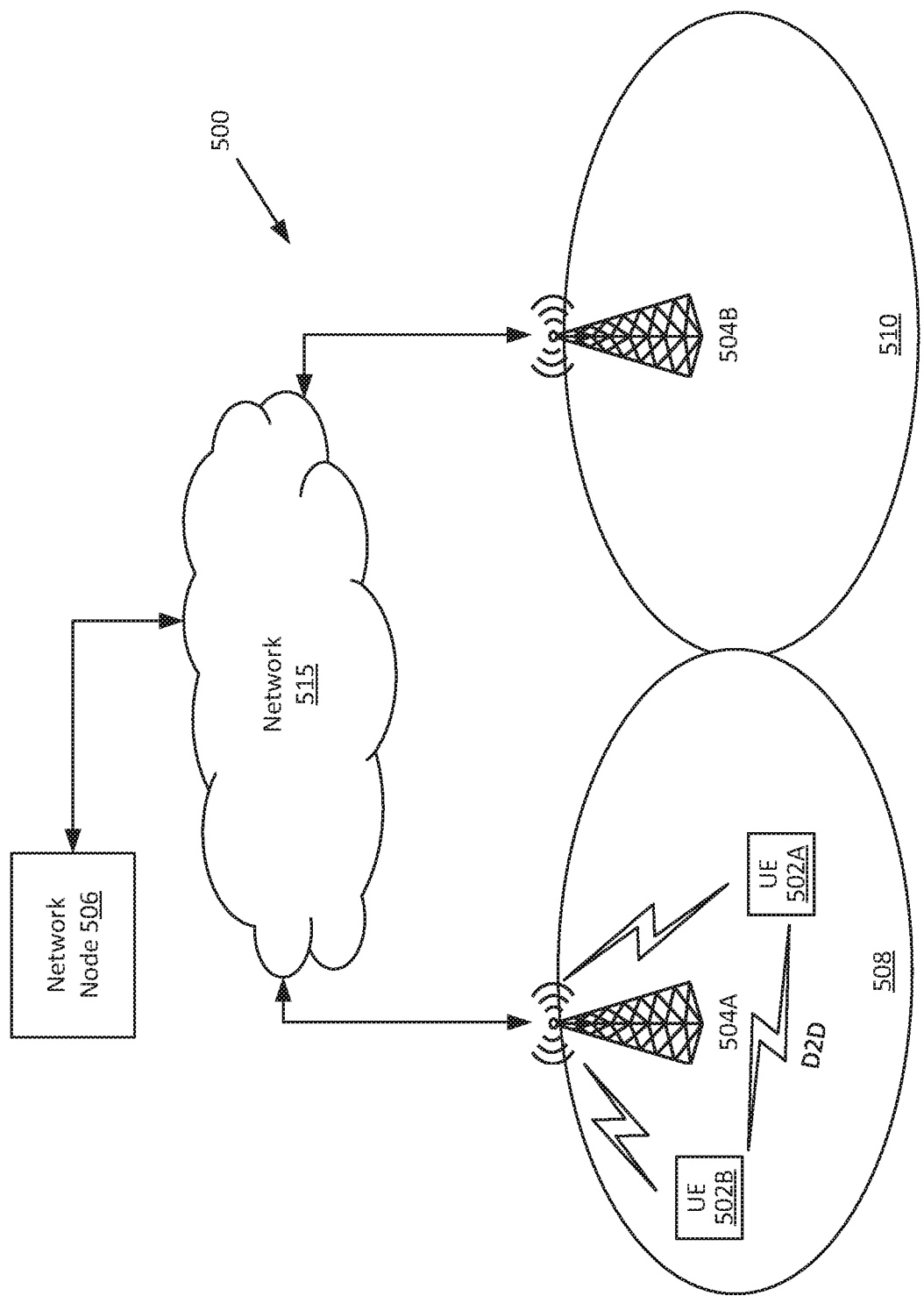
FIG. 10 is an example wireless network.

FIG. 10 illustrates an example of a wireless network 500 that can be used for wireless communications. Wireless network 500 includes wireless devices (e.g. UEs) 502A-502B and a plurality of network nodes, such as radio access nodes 504A-504B (e.g. eNBs, gNBs, etc.) connected to one or more network nodes 506 via an interconnecting network 515. The network 500 can use any suitable deployment scenarios. UEs 502 within coverage area 508 can each be capable of communicating directly with radio access node 104A over a wireless interface. In some embodiments, UEs 502 can also be capable of communicating with each other via D2D communication.

As an example, UE 502A can communicate with radio access node 504A over a wireless interface. That is, UE 502A can transmit wireless signals to and/or receive wireless signals from radio access node 504A. The wireless signals can contain voice traffic, data traffic, control signals, and/or any other suitable information. In some embodiments, an area of wireless signal coverage associated with a radio access node 504A can be referred to as a cell 508.

In some embodiments, the non-limiting term "network node" is used and it can correspond to any type of radio access node (or radio network node) or any network node, which can communicate with a device such as a user equipment (UE) and/or with another network node in a cellular or mobile or wireless or wired communication system. Examples of network nodes are NodeB, MeNB, SeNB, a network node belonging to MCG or SCG, base station (BS), multi-standard radio (MSR) radio access node such as MSR BS, eNodeB, gNB network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME, etc.), O&M, OSS, Self-organizing Network (SON), positioning node (e.g. E-SMLC), MDT, test equipment, etc.

In some embodiments, the term "radio access technology" (RAT) refers to any RAT e.g. UTRA, E-UTRA, narrow band internet of things (NB-IoT), WiFi, Bluetooth, next generation RAT (NR), 4G, 5G, etc. Any of the first and the second nodes may be capable of supporting a single or multiple RATs. The term "radio node" used herein can be used to denote a wireless device or a network node.

In some embodiments, an Edge Node or Virtual Edge Node as have been described herein can be collocated with a network node 506 and/or a radio node 504 as shown in FIG. 10. End user device 502 can be any wired or wireless device used to request and access content via the ISP and/or CDN.

Figure 11:
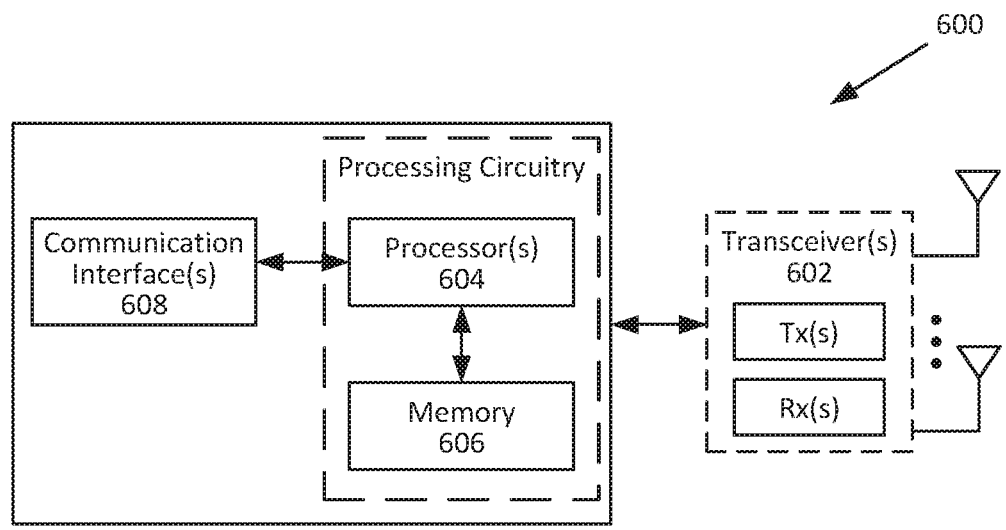
FIG. 11 is a block diagram of an example network node.

FIG. 11 is a block diagram of an exemplary network node 600, in accordance with certain embodiments. Network node 600 may include one or more of a transceiver 602, processor 604, memory 606, and communication/network interface 608. In some embodiments, the transceiver 602 facilitates transmitting wired/wireless signals to and receiving wired/wireless signals from other nodes or entities (e.g., via transmitter(s) (Tx), receiver(s) (Rx), and antenna(s)). The processor 604 executes instructions to provide some or all of the functionalities described above as being provided by a network node 600, the memory 606 stores the instructions executed by the processor 604. In some embodiments, the processor 604 and the memory 606 form processing circuitry. The network interface 608 communicates signals to backend network components, such as a gateway, switch, router, Internet, Public Switched Telephone Network (PSTN), core network nodes or radio network controllers, etc.

The processor 604 may include any suitable combination of hardware to execute instructions and manipulate data to perform some or all of the described functions of network node 600, such as those described above. In some embodiments, the processor 604 may include, for example, one or more computers, one or more central processing units (CPUs), one or more microprocessors, one or more application specific integrated circuits (ASICs), one or more field programmable gate arrays (FPGAs) and/or other logic.

The memory 606 is generally operable to store instructions, such as a computer program, software, an application including one or more of logic, rules, algorithms, code, tables, etc. and/or other instructions capable of being executed by a processor. Examples of memory 606 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, the network interface 608 is communicatively coupled to the processor 604 and may refer to any suitable device operable to receive input for network node 600, send output from network node 600, perform suitable processing of the input or output or both, communicate to other devices, or any combination of the preceding. The network interface 608 may include appropriate hardware (e.g., port, modem, network interface card, etc.) and software, including protocol conversion and data processing capabilities, to communicate through a network.

Other embodiments of network node 600 may include additional components beyond those shown in FIG. 11 that may be responsible for providing certain aspects of the network node's functionalities, including any of the functionalities described above and/or any additional functionalities (including any functionality necessary to support the solutions described above). The various different types of network nodes may include components having the same physical hardware but configured (e.g., via programming) to support different radio access technologies, or may represent partly or entirely different physical components.

Figure 12:
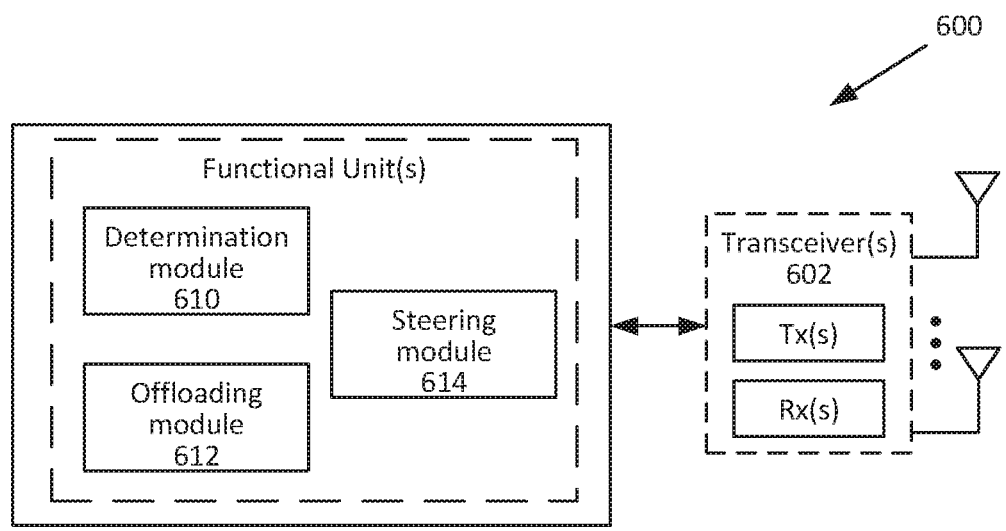
FIG. 12 is a block diagram of an example network node with modules.

In some embodiments, the network node 600, which can be, for example, an edge node or virtual edge node, may comprise a series of modules configured to implement the functionalities of the network node 600 described above. Referring to FIG. 12, in some embodiments, the network node 600 can comprise a determination module 610 for determining whether to handle a packet/session, an offloading module 612 for offloading a packet and a steering module 614 for transmitting the offloaded packet to a subsequent node.

It will be appreciated that the various modules may be implemented as combination of hardware and software, for instance, the processor, memory and transceiver(s) of network node 600 shown in FIG. 11. Some embodiments may also include additional modules to support additional and/or optional functionalities.

Some embodiments may be represented as a software product stored in a machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause processing circuitry (e.g. a processor) to perform steps in a method according to one or more embodiments. Those of ordinary skill in the art will appreciate that other instructions and operations necessary to implement the described embodiments may also be stored on the machine-readable medium. Software running from the machine-readable medium may interface with circuitry to perform the described tasks.

The above-described embodiments are intended to be examples only. Alterations, modifications and variations may be effected to the particular embodiments by those of skill in the art without departing from the scope of the description.

The invention claimed is:

1. A method performed by an edge node, the method comprising:
receiving a packet indicating a session;
determining that the indicated session is an established session;
determining whether the packet should be processed by the edge node;
responsive to determining to offload the packet, modifying the packet to include at least one of an offload status indicator and context information associated with the session; and
transmitting the modified packet to a subsequent edge node.

2. The method of claim 1, wherein the session is at least one of a Transport Layer Security (TLS) session and a Transmission Control Protocol (TCP) session.

3. The method of claim 1, further comprising, decrypting the session.

4. The method of claim 1, wherein determining that the indicated session is an established session comprises determining that the edge node has context information associated with the session.

5. The method of claim 1, further comprising, determining to offload the packet in accordance with at least of one an end user and a content request associated with the packet.

6. The method of claim 1, further comprising, determining to offload the packet in accordance with a resource bandwidth associated with the edge node.

7. The method of claim 1, wherein modifying the packet comprises encapsulating the received packet and adding the at least one of the offload status indicator and the context information as metadata.

8. The method of claim 1, further comprising, receiving a second packet indicating the established session, and determining to process the second packet by the edge node.

9. The method of claim 8, further comprising, determining that the second packet requires enforcement of a security policy.

10. The method of claim 9, wherein determining that the second packet requires enforcement of the security policy is in accordance with at least of one an end user and a content request associated with the second packet.

11. The method of claim 9, further comprising, instantiating at least one service function in the edge node for enforcing the security policy.

12. An edge node comprising a processor and a memory, the memory storing instructions that when executed by the processor configure the edge node to:
receive a packet indicating a session;
determine that the indicated session is an established session;
determine whether the packet should be processed by the edge node;
responsive to determining to offload the packet, modify the packet to include at least one of an offload status indicator and context information associated with the session; and
transmitting the modify packet to a subsequent edge node.

13. The edge node of claim 12, wherein the session is at least one of a Transport Layer Security (TLS) session and a Transmission Control Protocol (TCP) session.

14. The edge node of claim 12, further configured to decrypt the session.

15. The edge node of claim 12, wherein determining that the indicated session is an established session comprises determining that the edge node has context information associated with the session.

16. The edge node of claim 12, further configured to determine to offload the packet in accordance with at least of one an end user and a content request associated with the packet.

17. The edge node of claim 12, further configured to determine to offload the packet in accordance with a resource bandwidth associated with the edge node.

18. The edge node of claim 12, wherein modifying the packet comprises encapsulating the received packet and adding the at least one of the offload status indicator and the context information as metadata.

19. The edge node of claim 12, further configured to receive a second packet indicating the established session, and determine to process the second packet by the edge node.

20. The edge node of claim 19, further configured to determine that the second packet requires enforcement of a security policy.

21. The edge node of claim 20, wherein determining that the second packet requires enforcement of the security policy is in accordance with at least of one an end user and a content request associated with the second packet.

22. The edge node of claim 20, further comprising, instantiating at least one service function in the edge node for enforcing the security policy.

\* \* \* \* \*

UNITED STATES PATENT AND TRADEMARK OFFICE
CERTIFICATE OF CORRECTION

| | |
|---|---|
| PATENT NO. | : 11,343,322 B2 |
| APPLICATION NO. | : 16/955419 |
| DATED | : May 24, 2022 |
| INVENTOR(S) | : Migault et al. |

It is certified that error appears in the above-identified patent and that said Letters Patent is hereby corrected as shown below:

On the Title Page

Item (57) under "ABSTRACT", in Column 2, Line 4, delete "associated" and insert -- is associated --, therefor.

In the Specification

In Column 1, Line 40, delete "agreed between" and insert -- agreed upon between --, therefor.

In Column 2, Line 31, delete "at least of one" and insert -- at least one of --, therefor.

In Column 2, Line 45, delete "at least of one" and insert -- at least one of --, therefor.

In Column 4, Line 34, delete "provided agile" and insert -- provided with agile --, therefor.

In Column 8, Line 19, delete "though" and insert -- through --, therefor.

In Column 8, Line 38, delete "though" and insert -- through --, therefor.

In Column 11, Line 1, delete "(S SF)" and insert -- (SSF) --, therefor.

In Column 12, Line 3, delete "VNFO 306" and insert -- VNFO 300 --, therefor.

In Column 12, Line 14, delete "into" and insert -- of --, therefor.

In Column 12, Line 29, delete "NFVO 300" and insert -- VNFO 300 --, therefor.

In Column 12, Line 40, delete "NFVO 300" and insert -- VNFO 300 --, therefor.

In Column 12, Line 42, delete "NFVO 300" and insert -- VNFO 300 --, therefor.

Signed and Sealed this
Eighteenth Day of February, 2025

Coke Morgan Stewart
*Acting Director of the United States Patent and Trademark Office*

CERTIFICATE OF CORRECTION (continued)
U.S. Pat. No. 11,343,322 B2

In Column 12, Line 43, delete "NFVO 300" and insert -- VNFO 300 --, therefor.

In Column 12, Line 47, delete "NFVO 300" and insert -- VNFO 300 --, therefor.

In Column 13, Line 2, delete "NFVO 300," and insert -- VNFO 300, --, therefor.

In Column 13, Line 6, delete "URL TAG" and insert -- URL_TAG --, therefor.

In Column 13, Line 38, delete "the" (first occurrence) and insert -- be the --, therefor.

In Column 14, Line 33, delete "NFVO 300" and insert -- VNFO 300 --, therefor.

In Column 14, Line 37, delete "NFVO 300" and insert -- VNFO 300 --, therefor.

In Column 14, Line 42, delete "that" and insert -- from that --, therefor.

In Column 15, Line 24, delete "associates" and insert -- associated --, therefor.

In Column 15, Lines 64-65, delete "radio access node 104A" and insert -- radio access node 504A --, therefor.

In Column 16, Line 36, delete "user device 502" and insert -- user device 100 --, therefor.

In Column 17, Line 8, delete "and/or or" and insert -- and/or --, therefor.

In the Claims

In Column 18, Line 33, in Claim 5, delete "at least of one" and insert -- at least one of --, therefor.

In Column 18, Line 50, in Claim 10, delete "at least of one" and insert -- at least one of --, therefor.

In Column 18, Line 67, in Claim 12, delete "modify" and insert -- modified --, therefor.

In Column 19, Lines 11-12, in Claim 16, delete "at least of one" and insert -- at least one of --, therefor.

In Column 20, Line 12, in Claim 21, delete "at least of one" and insert -- at least one of --, therefor.